United States Patent
Mollov et al.

(10) Patent No.: US 6,718,069 B2
(45) Date of Patent: Apr. 6, 2004

(54) METHOD AND SYSTEM FOR REDUCING CORRELATED NOISE IN IMAGE DATA

(75) Inventors: Ivan P. Mollov, Cupertino, CA (US); Richard E. Colbeth, Los Altos, CA (US); Christopher Webb, Los Altos, CA (US); Jiann M. Yu, Los Altos, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 599 days.

(21) Appl. No.: 09/792,418

(22) Filed: Feb. 22, 2001

(65) Prior Publication Data

US 2002/0159649 A1 Oct. 31, 2002

(51) Int. Cl.[7] .............................. G06K 9/40; H04N 5/21
(52) U.S. Cl. ........................................ 382/265; 348/620
(58) Field of Search ................................ 382/254, 264, 382/265, 275, 267; 348/607, 619, 620, 533; 250/370.09

(56) References Cited

U.S. PATENT DOCUMENTS

| 4,727,506 | A | | 2/1988 | Fling |
| 5,130,798 | A | | 7/1992 | Christopher |
| 5,400,083 | A | | 3/1995 | Mizusawa |
| 5,442,407 | A | * | 8/1995 | Iu ............................... 348/620 |
| 5,508,751 | A | | 4/1996 | Nitta |
| 6,259,489 | B1 | * | 7/2001 | Flannaghan et al. ........ 348/620 |
| 6,535,254 | B1 | * | 3/2003 | Olsson et al. ............... 348/607 |
| 6,587,142 | B1 | * | 7/2003 | Kozlowski et al. ......... 348/241 |

OTHER PUBLICATIONS

Brailean, James C. et al.; "Noise Reduction Filters For Dynamic Image Sequences: A Review"; *IEEE*; vol. 83, No. 9; Sep. 1995; pp. 1272–1292.

* cited by examiner

*Primary Examiner*—Bhavesh M. Mehta
*Assistant Examiner*—Kanji Patel
(74) *Attorney, Agent, or Firm*—Bingham McCutchen LLP (57) ABSTRACT

A method and system for reducing correlated noise in imagers is disclosed. Methods are described for determining a pixel correction value. Correlated noise in data generated by imagers can be reduced by applying the pixel correction value to adjust image data before being displayed.

40 Claims, 9 Drawing Sheets

METHOD AND SYSTEM FOR REDUCING CORRELATED NOISE IN IMAGE DATA

BACKGROUND AND SUMMARY

The invention relates to imaging devices, such as flat panel imagers. An imager is a device that receives electromagnetic radiation, e.g., light or x-rays, from the direction of something to be imaged in which an image is formed based upon the detected pattern of the radiation at the imager. A flat panel imager is a type of imager that comprises a matrix/array of detection elements, with each detection element providing a separate item of image data that is usable to reconstruct an image. For light-sensitive imagers, each detection element comprises a photosensitive device. For x-ray sensitive imagers, each detection element comprises an x-ray sensitive device.

Figure 1:
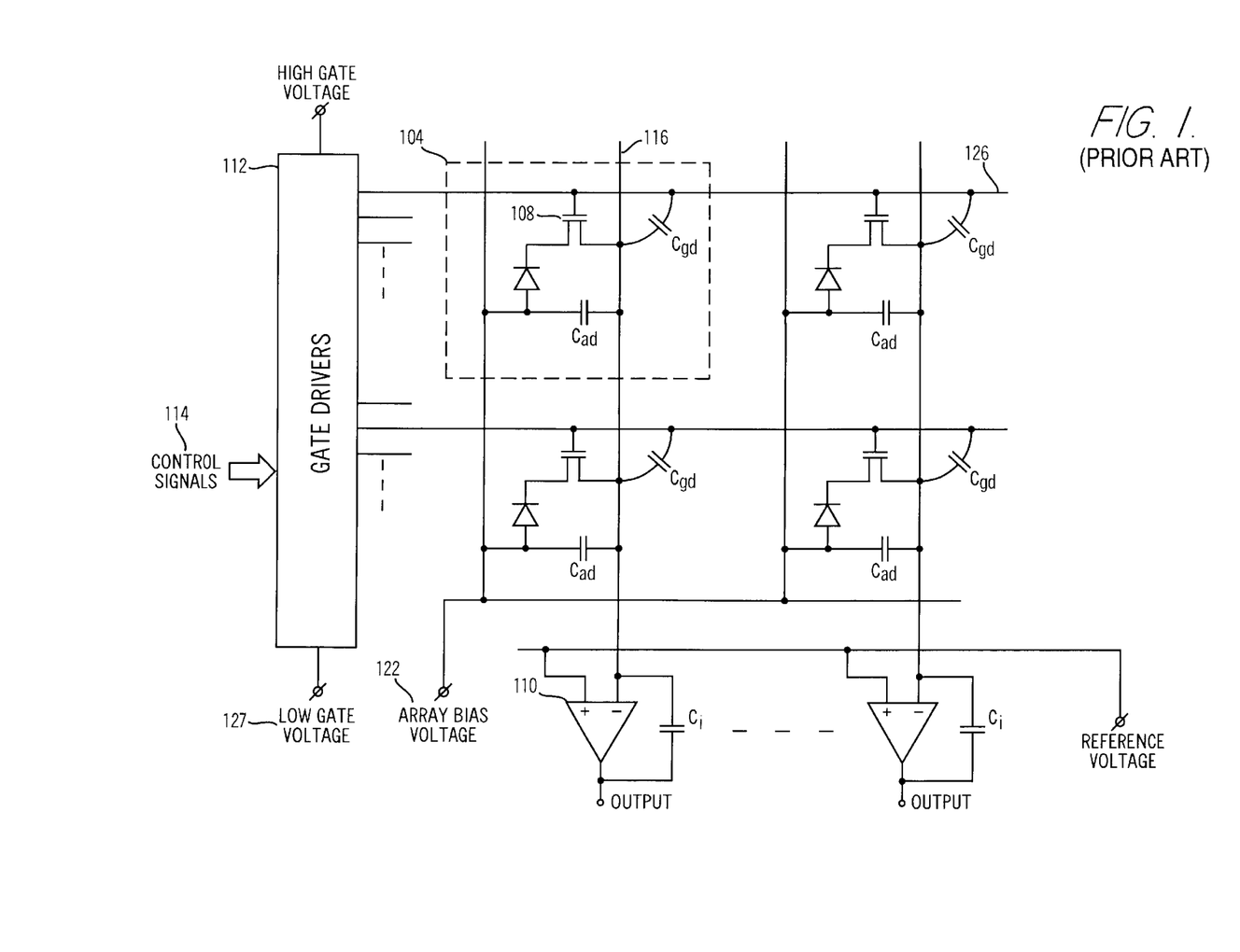
FIG. 1 shows a schematic of imager electronics.

FIG. 1 depicts one configuration of electrical components for a flat panel imager showing selectable wiring connections to transmit the voltage, current, or charge emitted by detection elements on the imager. Each image element 104 in the imager of FIG. 1 comprises a photodiode 106 that generates an electrical signal in response to a light input. A transistor 108 (such as a thin-film N-type FET) functions as a switching element for the image element 104. When it is desired to capture image data from image element 104, control signals 114 are sent to gate driver 112 to "select" the gate of transistor 108. Electrical signals from the photodiode 106 are passed through line 116 to a charge amplifier 110. The output of charge amplifier 110 is sent to a "sample and hold" stage for further image processing/display. While FIG. 1 only shows four image elements, it is likely that the typical flat panel imager includes many such image elements depending upon the size and resolution of the imager device.

Many imagers perform simultaneous sampling of image data from multiple image elements in a correlated manner. For example, the imager of FIG. 1 collects image data from an entire row or line of image elements at the same time. To form an entire image frame, each row of image data is collected on a row-by-row basis until all rows for the image has been sampled. To obtain image data for a row of image elements, all the switching transistors for image elements on the same row are tied to the same control line extending from gate driver 112. When the image data for a particular row of image elements is desired, control signals 114 are sent to the gate driver 112 to select the transistor gates for the desired row of image elements. The electrical signals from the entire row of image elements are passed to their corresponding charge amplifiers, which outputs signal data to the subsequent sampling stage.

The photodiodes of FIG. 1 are connected to a common node 122 to supply a reverse bias voltage for the image element array. The gate driver 12 is connected to a node 124 to supply low gate voltage to drive the gate control lines. Parasitic capacitance may exist in the imager, such as $C_{gd}$ to the gate control line and $C_{ad}$ to the common array bias line for each image element. Each amplifier may gain AC noise present on the low gate voltage and array bias voltage depending upon the ratio of the capacitances. If an entire row of image data is sampled at the same time, then the same noise offset may exist for every pixel in that row, which causes the corresponding row of pixels in the final image to appear markedly different from other rows of pixels. This type of "image artifact" is created in the example of FIG. 1 because the low gate voltage and the array bias voltage are common for all amplifiers for a row of data.

Figure 2A:
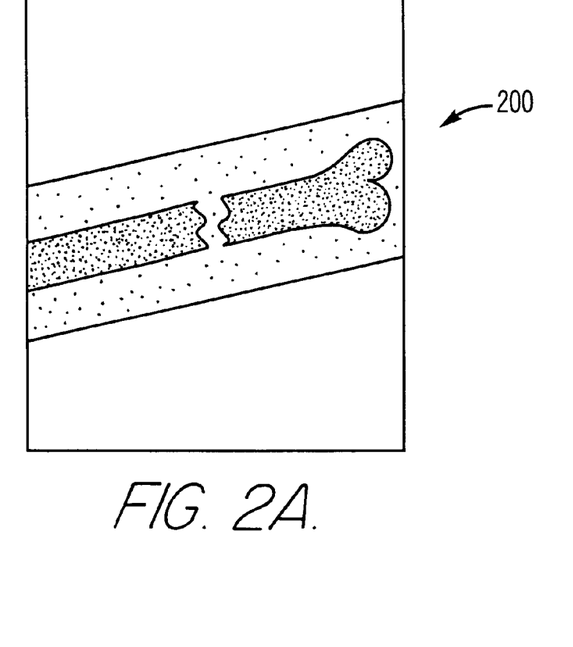
FIG. 2a depicts an example x-ray image produced by an x-ray imager device.
Figure 2B:
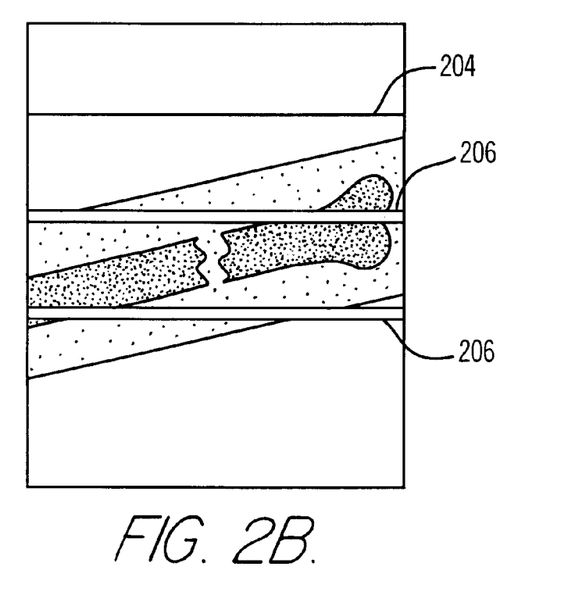
FIG. 2b depicts the x-ray image of FIG. 2a having image artifacts.

FIG. 2a shows an example x-ray image 200 captured using an x-ray imager device. FIG. 2b illustrates the x-ray image 200 of FIG. 1 having examples of image artifacts located thereon. The image artifact 204 is an example of line noise that causes pixel intensity in the affected row of pixels to be lower than pixel intensities for other rows of the image. Thus, the row of pixels corresponding to image artifact 204 appears relatively darker than other image rows. Image artifacts 206 are examples of line noise that cause pixel intensity in the affected rows to be higher than for other rows of the image. Thus, the rows of pixels corresponding to image artifacts 206 appear relatively brighter than other image rows. Compared to random pixel noise, this correlated line noise is often relatively more visible and may significantly degrade image quality.

The present invention is directed to a method and system for reducing correlated noise. According to an aspect of the invention, the invention reduces correlated noise in data generated by imagers by determining a pixel correction value that can be used to adjust image data before begin displayed. In an embodiment of the invention, each set of correlated pixels in a given image frame can be examined to provide a composite image value that can be compared to one or more composite image values for the same set of correlated pixels from prior frame(s). A single composite image value can be generated that represents composite image values for that set of correlated pixels for prior image frames. The composite image value for the present frame is compared to the composite image value for prior frames to determine whether pixel correction is required to reduce correlated noise in the final image. If pixel correction is required, then the set of correlated pixels is adjusted prior to being displayed. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is directed to a method and system for reducing correlated noise in images produced by electronic imagers. Correlated noise manifests itself based upon a correlation between image elements that are sampled together at the imager. Line noise results from an entire line of pixels that are sampled in a correlated manner.

The present invention provides a method and system for adjusting image values for pixels in each correlated group of pixels to reduce correlated noise. According to an aspect of the invention, each set of correlated pixels in a given image frame can be examined to provide a composite image value that can be compared to one or more composite image values for the same set of correlated pixels from prior frame(s). A single composite image value can be generated that represents composite image values for that set of correlated pixels for prior image frames. The composite image value for the present frame is compared to the composite image value for prior frames to determine whether pixel correction is required to reduce correlated noise in the final image. If pixel correction is required, then the set of correlated pixels is adjusted prior to being displayed.

To illustrate the invention, the following explanation is directed to a method and system for reducing line correlated noise that occurs for an entire row or column of image pixel data from an imager. The invention may also be applied to other groupings or granularities of correlated pixels in addition to lines of pixels. For example, if noise exists for only part of certain lines, then the invention could be applied to only those parts of a line that contains excess noise. As another example, the present invention can be used to address noise related to blocks of correlated pixels.

Figure 3:
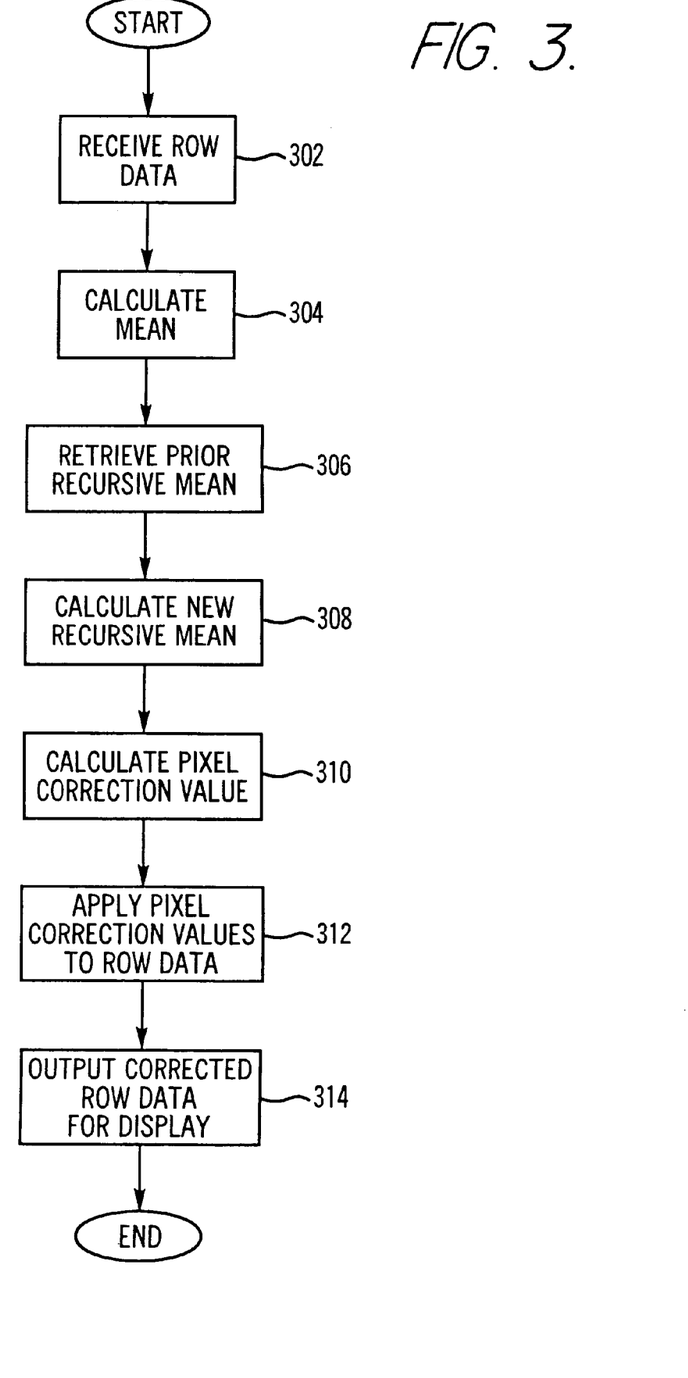
FIG. 3 is a flowchart of a method for reducing correlated line noise according to an embodiment of the invention.

FIG. 3 shows a flowchart of a method for reducing line correlated noise according to an embodiment of the invention. At 302, the method receives an entire row of data from an imager. A composite value is determined for the received row of data. The composite value is any value derived from a correlated group of pixel data that can be used to represent the group. Examples of approaches to determine a composite value include calculating a mean, a median, a partial mean, or a partial median for the values in a group of data. The line mean of the image values for a row of data is calculated at step 304, forming a composite value for the received row of pixel data. In an embodiment, the line mean $S_i(n)$ for a given row of pixels is calculated from individual pixel intensity values $P_{ij}(n)$ based upon the following:

$$S_i(n) = \sum_{j=1}^{x} P_{ij}(n)/X \qquad \text{EQ. 1}$$

where i is the row number, j is the column number, n is the frame number, and X is the number of pixels in the row.

The method then retrieves the prior recursively filtered line mean value for that same row of pixels for the prior image frame (306). The prior recursively filtered line mean value is used to generate a new recursively filtered line mean value for the present image frame (308). In an embodiment, the recursive filter is applied as follows:

$$R_i(n) = \beta S_i(n) + \alpha R_i(n-1) \qquad \text{EQ. 2}$$

where $R_i(n)$ is the new recursively filtered line mean value for row i in the present frame n, $R_i(n-1)$ is the recursively filtered line means for the prior frame, $\alpha$ is the recursive filter fraction, and $\beta = 1-\alpha$.

The recursive filter fraction $\alpha$ is applied to determine the relative weighting of the line means for the present and prior frames in determining the present value of $R_i(n)$. The greater the value of $\alpha$, the more relative emphasis or weight is placed on the line mean values for prior frames. Higher values for $\alpha$ result in higher levels of line noise reduction, but may cause image smearing due to object movement in the image frame. The optimal value of $\alpha$ used in the invention depends upon the specific image and application to which the invention is directed. In general, the value of $\alpha$ can be relatively higher when applying the invention to images having relatively uniform intensity values. The value of $\alpha$ can be relatively lower when applying the invention to images having significant non-uniform areas of intensity values.

No recursive filter calculation or correction is made for the first frame in a series in the present embodiment, such that $R_i(1) = S_i(1)$. Alternatively, a recursive filter calculation for the first frame in a series can be performed based upon historical data or constructed data models.

It is noted that other filtering approaches may be employed in the invention besides recursive filtering. For example, all image data for every prior image frame could be stored in memory and used to provide a composite value (e.g., an average) to determine a new filtered composite value for the present image frame. As another example, image data for only the latest x image frames could be stored in memory and used to provide a composite value to determine a new filtered composite value for the present image frame. In addition, one or more unfiltered composite values for prior image frame(s) can also be used to derive the new filtered composite value for the present image frame. One advantage of using recursive filtering is that this approach involves a relatively low memory requirement since image data for only a single prior image frame needs to be stored, while it still takes into account image data for other prior image frames.

The method then generates a pixel correction value that can be applied to adjust pixel intensity values for the row of pixels in the present frame to reduce line correlated noise (310). In an embodiment, the pixel correction value is the offset between the line mean and the new recursively filtered line mean value:

$$\Delta_i(n) = R_i(n) - S_i(n) \qquad \text{EQ. 3}$$

where $\Delta_i(n)$ is the pixel correction value for each pixel in row i of image frame n, $R_i(n)$ is the new recursively filtered line mean value determined in step 308, and $S_i(n)$ is the line mean value determined in step 304.

For $n \geq 2$ in an embodiment, each pixel in the row may be corrected as follows (312):

$$P_{ij}^R(n) = P_{ij}(n) + \{R_i(n) - S_i(n)\} = P_{ij}(n) + \Delta_i(n) \qquad \text{EQ. 4}$$

where $$P_{ij}^R(n)$$

is the corrected pixel value for row i in column j of image frame n. Each adjusted pixel in the row can be outputted for further display (314).

Figure 4:
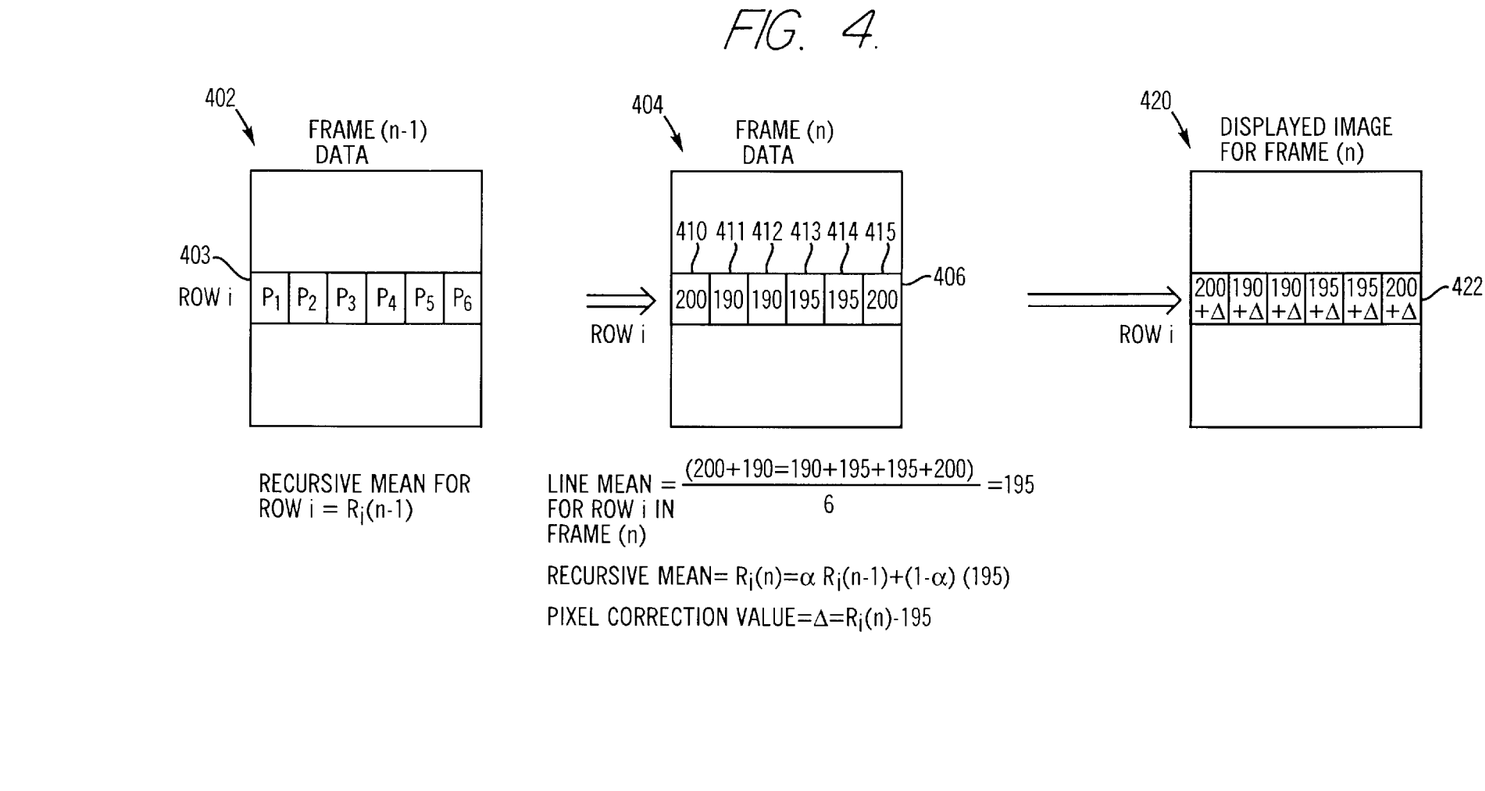
FIG. 4 illustrates the invention as applied to a row of image data.

FIG. 4 further illustrates this aspect of the invention. Image frame 404 represents the present image frame that is being processed for display. Image frame 404 includes a row 406 having six image pixels 410, 411, 412, 413, 414, and 415. The pixel intensity values for these pixels are as follows: intensity of image pixel 410=200; intensity of image pixel 411=190; intensity of image pixel 412=190; intensity of image pixel 413=195; intensity of image pixel 414=195; intensity of image pixel 415=200. The average pixel intensity value (line mean) for row 406 in the present image frame 404 is ((200+190+190+195+195+200)/6)=195.

Image frame 402 represents the immediately preceding image frame. Row 403 in prior image frame 402 has the same row position as row 406 in image frame 404. Row 403 in prior image frame 402 has a recursively filtered mean value of $R_i(n-1)$. Using Equation 2, it can be seen that the new recursively filtered mean value of $R_i(n)$ for row 406 in image frame 404 is $((1-\alpha)*195)+((\alpha)*R_i(n-1))$. Based upon Equation 3, the pixel correction value for each pixel in row 406 would therefore be $\Delta_i(n)=R_i(n)-195$. This pixel correction value can be applied to each pixel in row 406 to form an adjusted row 422 that is displayed in displayed image frame 420.

If the weighting factor is set at $\alpha=0.5$, and the prior recursively filtered mean value $R_i(n-1)=185$, then it can be seen that the new recursively filtered mean value of $R_i(n)=190$. Recall that the actual line mean for row 406 is 195, which is higher than this recursively filtered mean value. Thus, line noise may have caused the pixels in row 406 to possess intensity values that are too high. In this circumstance, the pixel correction value $\Delta_i(n)=R_i(n)-195$ is equal to $(-5)$. This pixel correction value of $(-5)$ is added to each pixel 410–415 in row 406 to form the pixel intensity values in row 422 of the displayed image frame 420 (i.e., pixel values of $\{195, 185, 185, 190, 190, 195\}$).

If the weighting factor is set at $\alpha=0.5$, and the prior recursively filtered mean value $R_i(n-1)=205$, then it can be seen that the new recursively filtered mean value of $R_i(n)=200$. Recall that the actual line mean for row 406 is 195, which is lower than this recursively filtered mean value. Thus, it is possible that line noise caused the pixels in row 406 to possess intensity values that are too low. In this circumstance, the pixel correction value $\Delta_i(n)=R_i(n)-195$ is equal to $(+5)$. This pixel correction value of $(+5)$ is added to each pixel 410–415 in row 406 to form the pixel intensity values in row 422 of the displayed image frame 420 (i.e., pixel values of $\{205, 195, 195, 200, 200, 205\}$).

Figure 5:
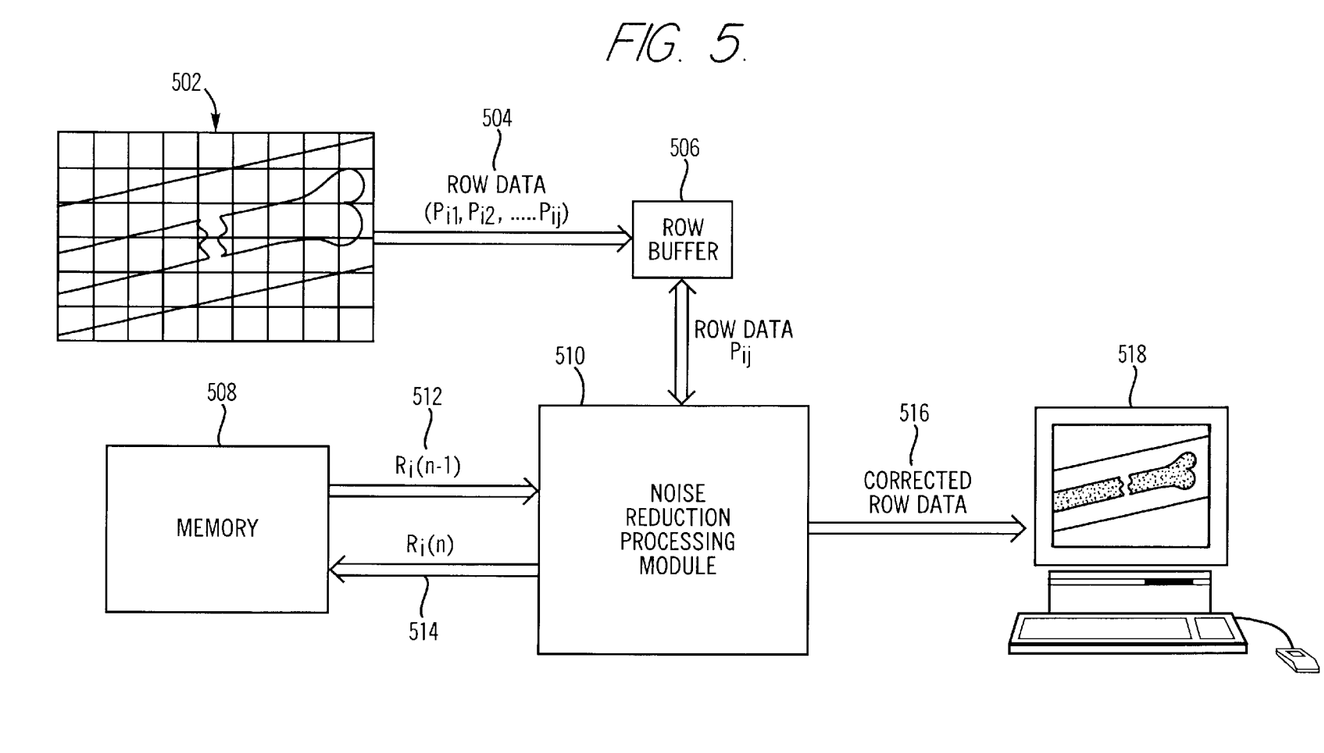
FIG. 5 is depicts an architecture that may be employed in an embodiment of the invention.

FIG. 5 shows an architecture that may be used to implement an embodiment of the present invention. An imager 502 provides data corresponding to an object to be imaged. Row data 504 corresponding to a row i is transmitted from control electronics on the imager 502 to a noise reduction processing module 510. In an embodiment, the row data 504 is buffered at a buffer 506. Alternatively, row data 504 is directly sent to noise reduction processing module 510 without being stored at a buffer 506. The noise reduction processing module is configured to generate a line mean value for the row data 504 in a manner consistent with Eq. 1.

A memory component 508 stores recursively filtered mean values for each row of the prior image frame. A data path 512 exists between the memory component 508 and the noise reduction processing module 510 to retrieve the recursively filtered mean value for a row i of the prior image frame. The noise reduction processing module 510 is configured to generate a new recursively filtered mean value for row i of the present image frame in a manner consistent with Eq. 2. A data path 514 exists to store the new recursively filtered mean value in the memory component 508.

The noise reduction processing module 510 is configured to generate a pixel correction value in a manner consistent with Eq. 3. The noise reduction processing module 510 is configurable to adjust pixel intensity values in row data 504 as set forth in Eq. 4. The corrected row data 516 is transmitted to a display device 518 and/or to a data storage device (not shown). The corrected row data 516 can thereafter be displayed.

In an embodiment, some or all of the components shown in FIG. 5, including the noise reduction processing module 510, are implemented using one or more programmable logic devices such as field programmable gate arrays ("FPGAs"). For real-time processing of image data from an imager, programmable logic devices are preferably used to implement the noise reduction processing module 510. Alternatively, a general purpose computer can be programmably configured to implement the architecture shown in FIG. 5.

Figure 6:
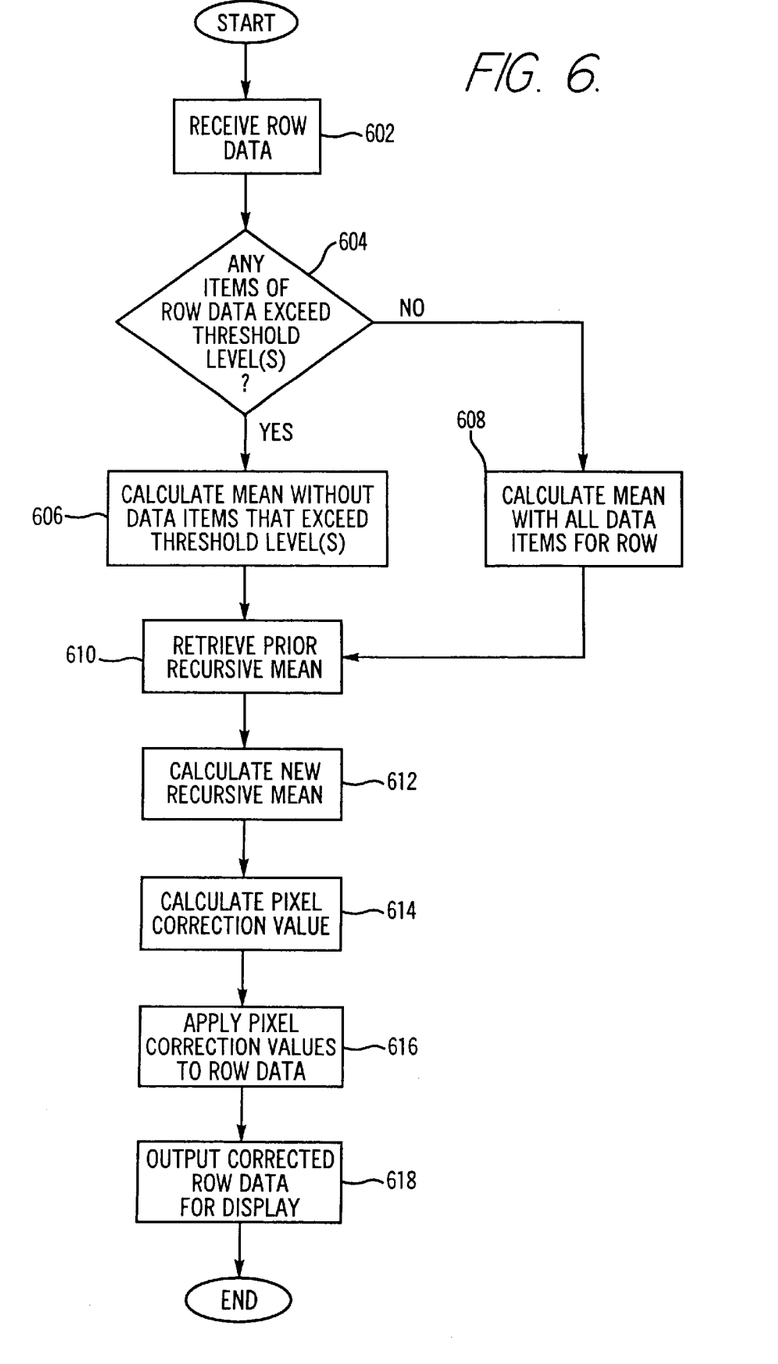
FIGS. 6, 7a, 7b, and 8 are flowcharts of alternate methods for reducing correlated line noise according to embodiments of the invention.

FIG. 6 shows a flowchart of another embodiment of the invention. The approach of FIG. 6 provides more accurate noise reduction under certain circumstances, particularly for images in which the frame-to-frame noise in certain image regions exceed the line noise, and/or in which high pixel values are heavily weighted in the mean calculation which may result in apparent noise introduction for attenuated parts of the image line. This circumstance may arise, for example, as a consequence of capturing x-ray images having bright regions corresponding to unattentuated x-rays. The approach of FIG. 6 sets pixel threshold level(s) beyond which pixels are ignored during the line mean calculation.

Similar to the method of FIG. 3, the method of FIG. 6 begins by receiving a row of image pixel data (602). A determination is made regarding whether any pixel data exceeds established pixel threshold(s). In an embodiment, only a high pixel threshold level is established to screen pixel values. Alternatively, both high and low threshold values may be established, or only a low pixel threshold value may be established. For example, if only a high pixel threshold value, $T_p$, is established, then a given pixel value $P_{ij}$ is included in the calculation of Eq. 1 to determine a line mean only if that pixel value is less than or equal to the high pixel threshold value $T_p(P_{ij}<=T_p)$ (606). If no pixel values exceed established pixel threshold(s), then all of the pixel data for the row are included for calculating the line mean (608).

The rest of the method steps in FIG. 6 proceed similarly to the method of FIG. 3, in which the recursively filtered line mean for the same row in the prior image frame is retrieved from memory (610). The previous filtered line mean value is used to calculate a new recursively filtered line mean value for the row in the present frame (612). A pixel correction value is determined (614), which is applied to the pixel values in the row of the present frame (616) before being sent to a display device or data storage unit (618).

In an embodiment, the value of the pixel threshold(s) are not statically established, but may be dynamic and dependent on the image content. If the pixel threshold value is dynamic, it should generally be slowly varying, and can therefore be implemented in a manner where its calculation is performed as a background task rather than considered as a real-time frame-by-frame calculation.

Appendix A discloses program listings in the C programming language for an embodiment of the invention for calculating the high pixel threshold value $T_p$. The approach of Appendix A sets the threshold at a minimum in the histogram corresponding to the onset of unattenuated x-rays for an x-ray image. In the program listings of Appendix A, only a coarse histogram is generated with ~10–40 bins depending on the maximum pixel value. A search is made for the desired minimum starting at the low pixel values. Any minimum found that includes less than some fraction (currently set to 0.33 in the program listings) of the total number of pixels is rejected. Also any shallow minimum with a pixel count value that is greater than 0.5 the maximum pixel count value in the histogram, or the maximum in that part that has already been searched, is rejected.

Figure 7A:
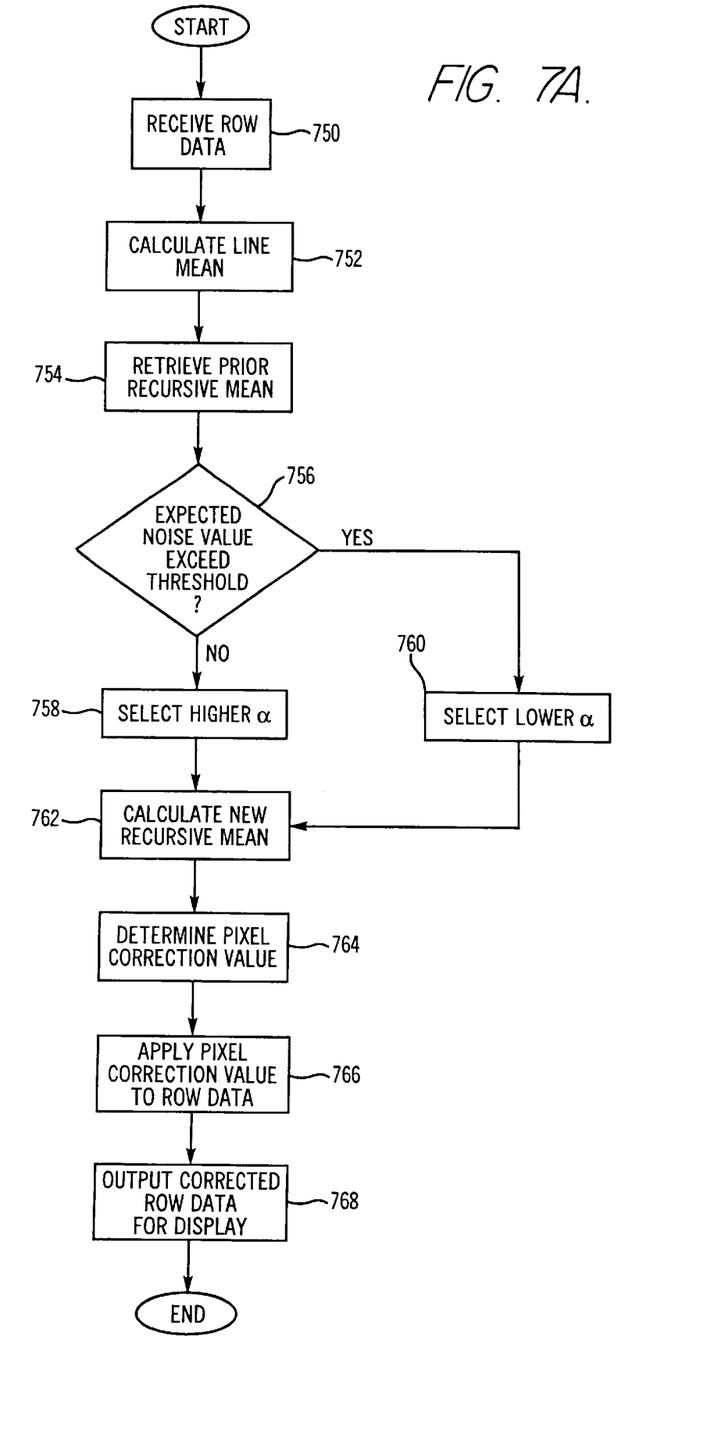

FIG. 7a represents an approach in which the recursive filter fraction $\alpha$ is not statically established, but can be modified to provide more accurate noise reduction in the adjusted image data. A relatively high value for α may provide increased line noise reduction. However, if the α value is set too high, then excessive additional image noise, such as intensity shifts, may appear in the corrected image. In the method of FIG. 7a, two values for α are defined, with a first value $\alpha_{low}$ being lower than the second value $\alpha_{high}$. This approach applies the smaller value $\alpha_{low}$ when the noise in a given line is predicted to exceed a threshold. The method begins by receiving a row of data for the present image frame (750), calculating a line mean for the row data (752), and retrieving the recursively filtered line mean for the row from a prior image frame (754).

The method determines whether the expected noise in the line will exceed a given threshold (756). One approach for determining whether excess noise, e.g. intensity shifts, will appear in the corrected image is to calculate the difference between the actual line mean value and the recursively filtered line mean for the row in the prior image frame. If the absolute value of this difference exceeds a given threshold value T, then the lower weighting value $\alpha_{low}$ is selected (760). If the absolute value of this difference does not exceed threshold value T, then the higher weighting value $\alpha_{high}$ is selected (758).

The selected value for α is used to calculate a new recursively filtered line mean for the present image frame (762). The pixel correction value can then be determined (714), and used to adjust the row data (716) before sending the corrected row data to a display device (718).

The threshold value T can be related to the line noise. In an embodiment, the evaluation of T is performed during the offset calibration, and the threshold value T can be calculated as follows:

$$T = m\sigma \quad \text{EQ. 5}$$

where σ is an average standard deviation and m is a noise factor, which is set at "3" in an embodiment. The standard deviation of the line means may be calculated from a set of N frames as follows:

$$\sigma_i = sqrt\left[\frac{N\sum_{n=1}^{N}(S_i(n))^2 - \left[\sum_{n=1}^{N}S_i(n)\right]^2}{N(N-1)}\right] \quad \text{EQ. 6}$$

In the present embodiment, it is not necessary to calculate an average $\sigma_i$ for all lines.

Figure 7B:
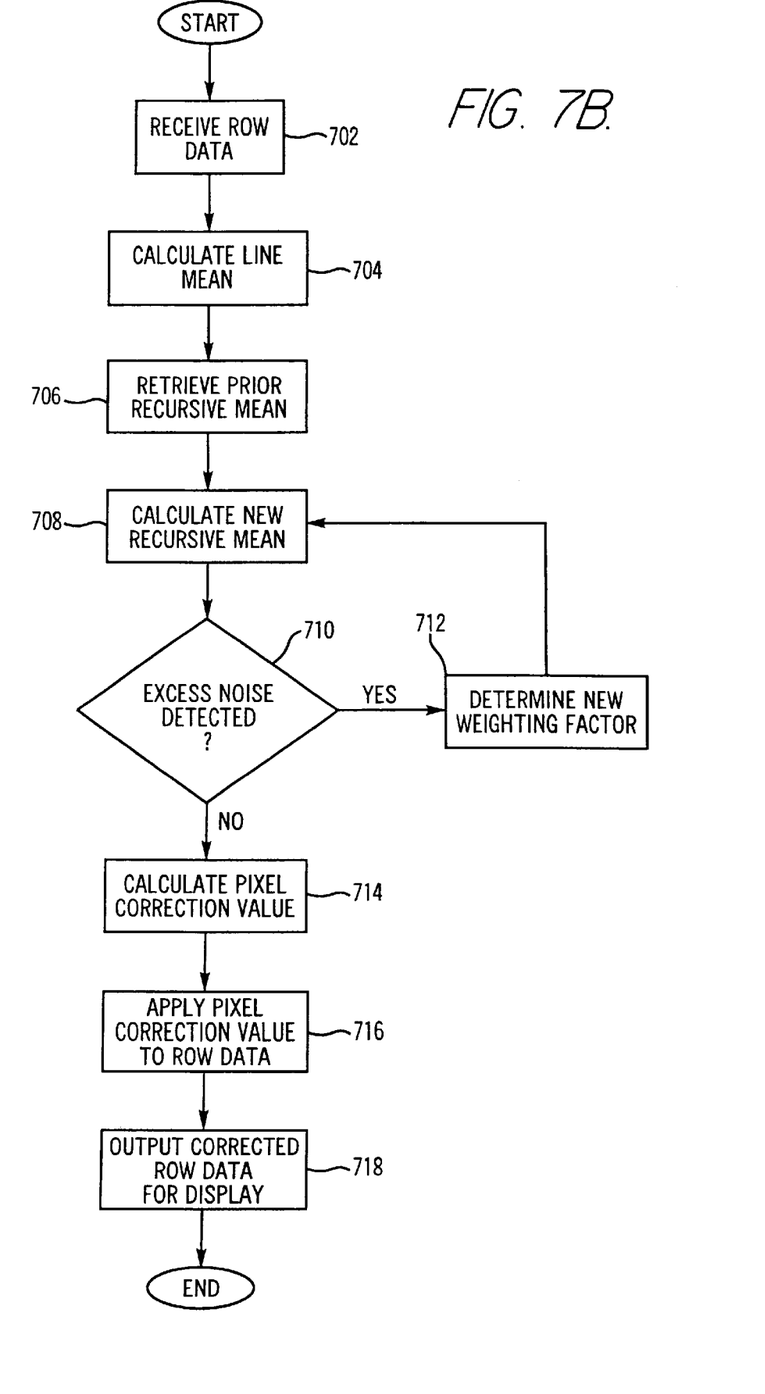

FIG. 7b represents an alternate approach in which the recursive filter fraction α is not statically established, but can be modified based upon predicted increased noise in the adjusted image data. The method begins by receiving a row of data for the present image frame (702), calculating a line mean for the row data (704), and retrieving the recursively filtered line mean for the row from a prior image frame (706).

The method determines a new recursively filtered line mean for the row for the present image frame (708) based upon an initially selected recursive filter fraction value α. The initial α value may be selected to be relatively high to provide increased line noise reduction. However, if the α value is set too high, then excessive additional image noise may appear in the corrected image. If the method determines that excess noise will appear in the corrected image (710), then a new α value is selected (712) to calculate another recursively filtered line mean for the present image frame. In an embodiment, this sequence repeats until an acceptable noise level is predicted for the corrected image. The pixel correction value can then be determined (714), and used to adjust the row data (716) before sending the corrected row data to a display device (718).

One approach for determining whether excess noise, e.g. intensity shifts, will appear in the corrected image is to calculate the difference between the actual line mean value and the recursively filtered line mean for the row. If the absolute value of this difference exceeds a given threshold T, then a lower value of α is selected. In an alternate approach, the difference between the actual line mean value and the recursively filtered line mean for the row in the prior image frame can be determined. Similar to the previous approach, if the absolute value of this difference exceeds a threshold T, then a lower value of α is selected.

The lowered value of α can be based upon a predetermined offset. Alternatively, the lower value of α can be dynamically established based upon the amount of excess noise that is detected, e.g., a smaller change in α if the threshold value is exceeded by a small margin and a larger change in α if the threshold value is exceeded by a larger margin.

In an embodiment, the recursive filter fraction value α is not changed on a line-by-line basis, but is changed on a more global basis in which the change in the α value is applied to multiple rows of pixel data.

Figure 8:
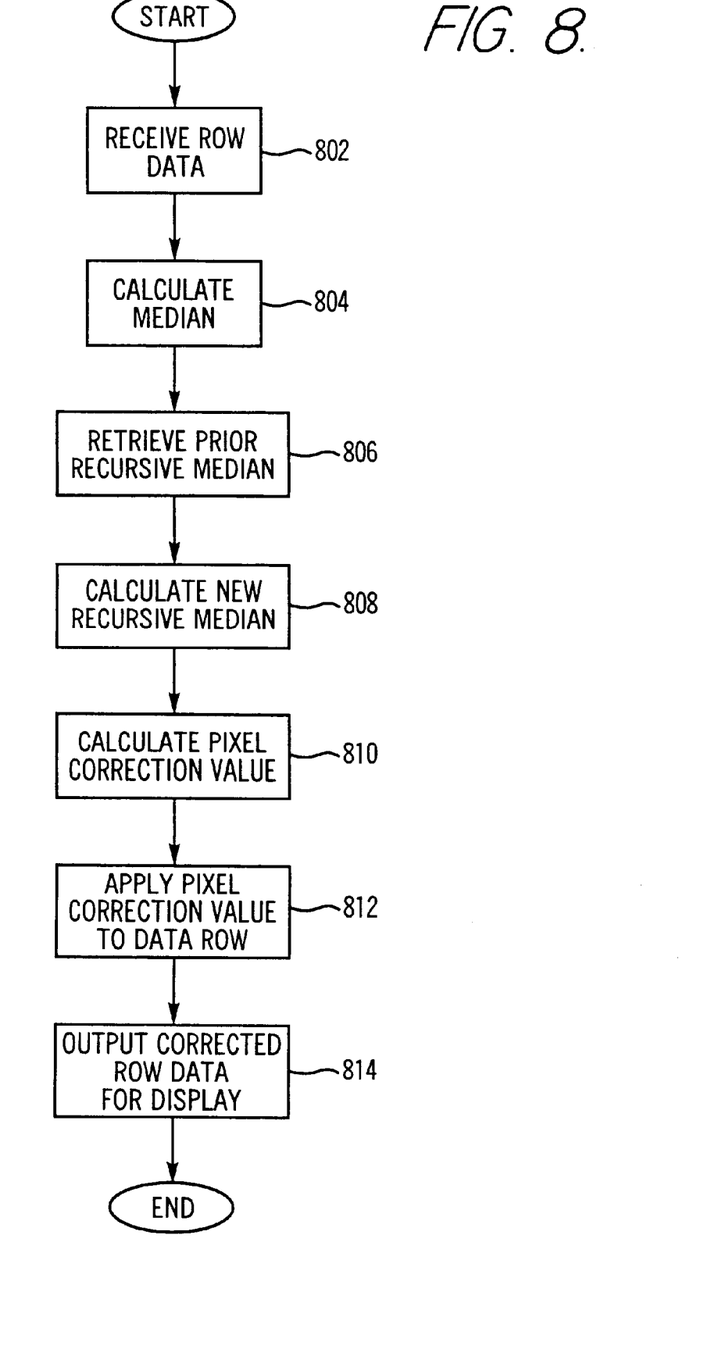

Alternate approaches may be used to calculate a composite value for a row of pixel data. FIG. 8 shows a flowchart of an alternate method for line noise reduction, in which the median value for a row of pixel data is used instead of the mean. This method begins by receiving a row of pixel data (802). The median pixel value of the row of pixel data is determined at step 804. The recursively filtered line median value for a prior image frame is retrieved from memory (806). A new recursively filtered line median value for the present image frame is then determined (808), e.g., using Eq. 2. A pixel correction value is calculated based upon the new recursively filtered line median value for the present image frame (810), e.g., using Eq. 3. The pixel correction value may be applied to the row of image data (812) and the adjusted row of pixel data may then be displayed (814).

Using the median line value inherently factors out extreme pixel values that may appear in a row of pixels, e.g., regions of x-ray image resulting from unattentuated x-rays. Other calculations may also be employed in the invention to provide different weighing factors to different pixels in a row prior to calculating a composite value for the row or performing noise reduction calculations.

The methods described herein (e.g., described with respect to FIGS. 3, 6, 7, and 8) may be separately implemented to reduce correlated noise in image data. Alternatively, some or all of the disclosed methods may be used in combination with each other.

It is noted that each of the methods described herein may be implemented using hardware (e.g., programmable logic devices or application specific circuits), software (e.g., in a general purpose computer or dedicated programmable equipment), or a combination of both hardware and software. Moreover, the invention may be used with any suitable form of processing equipment or computing architecture and may be implemented onto any suitable form of computer usable medium.

In the foregoing specification, the invention has been described with reference to specific embodiments thereof. It will, however, be evident that various modifications and changes may be made thereto without departing from the broader spirit and scope of the invention. For example, the invention is particularly described with reference to reducing noise for lines of image data; the invention is not limited to lines of data, and is equally applicable to reducing correlated noise for other quantities of image data. In addition, the invention has been described with reference to a comparison of recursively filtered line means for an immediately preceding image frame; it is noted that a similar comparison can be made against an individual earlier image frame or other earlier recursive image frame values. Moreover, the specific ordering and combination of process actions shown in the process flow diagrams described herein are merely illustrative, and the invention can be performed using different or additional process actions, or a different combination or ordering of process actions. The specification and drawings are, accordingly, to be regarded in an illustrative rather than restrictive sense.

APPENDIX A

```
void PreviewFrame(WORD* pix, int x, int y, int* satValue)
{
    int i, numPix, pxMax;
    double hist[MAX_NUM_BINS+10];
// 'int' could also be used instead of double
    memset(hist, 0, sizeof(double) * (MAX_NUM_BINS+10));
    static bool oneSaved=false;
    const double minFraction = 0.33;
    int binSize, histMax;
    numPix = x*y;
// estimate the pixel maximum from a sampling
    pxMax = pix[SAMPLE_INCR]; //SAMPLE_INCR=20
    for(i=SAMPLE_INCR; i<numPix; i+=SAMPLE_INCR)
        if(pix[i] > pxMax)
            pxMax = pix[i];
// create the binned histogram
// define the bin size to give 10-40 bins depending upon pxMax
    if(pxMax<40)
    {
        // turn off the saturation correction and return
        *satValue = pxMax * 2;
        return;
    }
    else if(pxMax < 100)
        binSize = pxMax/ 10;
    else if(pxMax < 400)
        binSize = 10;
    else
        binSize = pxMax/MAX_NUM_BINS;
// Use the same sampled pixels in forming the histogram
// as finding the pixel maximum.
    for(i=SAMPLE_INCR; i<numPix; i+=SAMPLE_INCR)
        hist[(pix[i] + binSize - 1) / binSize]++;
// only values of 0 will result in bin 0
// all others will be binned multi-pixel values
    int count = (int)hist[0];
    histMax = (int)hist[1];
    i=1;
// find minimum
    do
    {
        do // find max
        {
            count += (int)hist[i++];
        } while(hist[i] > hist[i-1] && i<=MAX_NUM_BINS);
        if(histMax <hist[i-1])
            histMax = (int)hist[i-1];
        do
        {
            count += (int) hist[i++];
        } while(hist[i] <hist[i-1] && I<=MAX_NUM_BINS);
    }
    while((count <minFraction*numPix/SAMPLE_INCR ||
           2*hist[i] > histMax) && i<=MAX_NUM_BINS);
    *satValue = i * binSize;
}
```

What is claimed is:

1. A method for reducing correlated noise in image data, comprising:

receiving a set of correlated data from an imaging device, the set of correlated data corresponding to a set of two or more correlated image pixels for a present image frame;

determining a composite value for the set of correlated data;

receiving a prior composite value corresponding to the set of two or more correlated image pixels from a prior image frame;

determining a new filtered composite value for the set of two or more correlated image pixels for the present image frame;

determining a pixel correction value based upon the new filtered composite value for the set of two or more correlated image pixels for the present image frame; and applying the pixel correction value to the set of correlated data to reduce correlated noise in the set of two or more image pixels for the present image frame.

2. The method of claim 1 in which the new filtered composite value is based upon recursive filtering corresponding to the prior composite value for the prior image frame.

3. The method of claim 2 in which the new filtered composite value is determined by:

$$R_i(n)=\beta S_i(n)+\alpha R_i(n-1)$$

where $R_i(n)$ is the new filtered composite value for pixels i in the present image frame n, $R_i(n-1)$ is the prior composite value for the prior image frame (n−1), $\alpha$ is a recursive filter fraction, and $\beta=1-\alpha$.

4. The method of claim 2 in which a weighting factor is applied to establish the relative weight of the prior composite value corresponding to the set of two or more correlated image pixels from the prior image frame in determining the new filtered composite value for the set of two or more correlated image pixels for the present image frame.

5. The method of claim 4 in which the weighting factor is not static.

6. The method of claim 5 in which the weighting factor changes if excessive noise is predicted for the present image frame.

7. The method of claim 6 in which the weighting factor changes based upon the amount of excessive noise that is detected.

8. The method of claim 6 in which excessive noise is predicted if the absolute value of the difference between the composite value and the prior composite value for the prior image frame exceeds a threshold T.

9. The method of claim 8 in which the threshold value T is determined by:

$$T=m\sigma$$

where $\sigma$ is a standard deviation and m is a noise factor.

10. The method of claim 6 in which two alternate values exist for the weighting factor, the two alternate values comprising a higher weighting factor and a lower weighting factor, wherein the lower weighting factor is selected if excessive noise is predicted and the higher weighting factor is selected if excessive noise is not predicted.

11. The method of claim 5 in which the weighting factor changes based upon a predetermined offset.

12. The method of claim 1 in which the composite value for the set of correlated data is determined based upon less than all of the set of correlated data.

13. The method of claim 12 in which an item of data from the set of correlated data is not included to calculate the composite value if the item of data is beyond a threshold.

14. The method of claim 13 in which the threshold dynamically changes based upon the content of the present image frame.

15. The method of claim 13 wherein the item of data is not included to calculate the composite value if the item of data is larger than the threshold.

16. The method of claim 1 in which the composite value is a mean.

17. The method of claim 1 in which the composite value is a median.

18. The method of claim 1 in which the set of two or more correlated image pixels for the present image frame corresponds to a row of pixels.

19. The method of claim 1 in which the pixel correction value is determined by:

$$\Delta_i(n) = R_i(n) - S_i(n)$$

where $\Delta_i(n)$ is the pixel correction value for each pixel in the set of two or more correlated image pixels i of the present image frame n, $R_i(n)$ is the new filtered composite value, and $S_i(n)$ is the composite value.

20. The method of claim 1 in which the imaging device comprises an x-ray imager.

21. A system for reducing correlated noise in image data, comprising:

an input for receiving a set of correlated data from an imaging device, the set of correlated data corresponding to a set of two or more correlated image pixels for a present image frame;

a memory, the memory configurable to store a prior composite value corresponding to the set of two or more correlated image pixels from a prior image frame, the memory configurable to store a new filtered composite value for the set of two or more correlated image pixels for the present image frame; and a noise reduction processing module comprising a processor component that is configured to generate a composite value for the set of correlated data, configured to generate the new filtered composite value, and configured to generate a pixel correction value based upon the new filtered composite value for the set of two or more correlated image pixels for the present image frame; and an output to output an adjusted set of the correlated data based upon the pixel correction value.

22. The system of claim 21 in which the noise reduction processing module comprises a programmable logic device.

23. The system of claim 22 in which the programmable logic device is a field programmable gate array.

24. The system of claim 21 in which the noise reduction processing module is implemented using a general purpose computer.

25. The system of claim 21 in which the new filtered composite value is based upon recursive filtering corresponding to prior composite values for all prior image frames.

26. The system of claim 25 in which the new filtered composite value is determined by:

$$R_i(n) = \beta S_i(n) + \alpha R_i(n-1)$$

where $R_i(n)$ is the new filtered composite value for pixels i in the present image frame n, $R_i(n-1)$ is the prior composite value for the prior image frame (n−1), $\alpha$ is a recursive filter fraction, and $\beta = 1 - \alpha$.

27. The system of claim 25 in which a weighting factor is applied to establish the relative weight of the prior composite value corresponding to the set of two or more correlated image pixels from the prior image frame in determining the new filtered composite value for the set of two or more correlated image pixels for the present image frame.

28. The system of claim 27 in which the weighting factor changes if excessive noise is predicted for the present image frame.

29. The system of claim 28 in which the weighting factor changes based upon the amount of excessive noise that is detected.

30. The system of claim 28 in which excessive noise is predicted if the absolute value of the difference between the composite value and the prior composite value for the prior image frame exceeds a threshold T.

31. The system of claim 29 in which two alternate values exist for the weighting factor, the two alternate values comprising a higher weighting factor and a lower weighting factor, wherein the lower weighting factor is selected if excessive noise is predicted and the higher weighting factor is selected if excessive noise is not predicted.

32. The system of claim 21 in which the composite value for the set of correlated data is determined based upon less than all of the set of correlated data.

33. The system of claim 32 in which an item of data from the set of correlated data is not included to calculate the composite value if the item of data is beyond a threshold.

34. The system of claim 33 in which the threshold dynamically changes based upon the content of the present image frame.

35. The system of claim 33 wherein the item of data is not included to calculate the composite value if the item of data is larger than the threshold.

36. The system of claim 21 in which the composite value is a mean.

37. The system of claim 21 in which the composite value is a median.

38. The system of claim 21 in which the set of two or more correlated image pixels for the present image frame corresponds to a row of pixels.

39. The system of claim 21 in which the pixel correction value is determined by:

$$\Delta_i(n) = R_i(n) - S_i(n)$$

where $\Delta_i(n)$ is the pixel correction value for each pixel in the set of two or more correlated image pixels i of the present image frame n, $R_i(n)$ is the new filtered composite value, and $S_i(n)$ is the composite value.

40. A computer program product that includes a medium usable by a processor, the medium having stored thereon a sequence of instructions which, when executed by the processor, causes the processor to execute a process for reducing correlated noise in image data, the process comprising:

receiving a set of correlated data from an imaging device, the set of correlated data corresponding to a set of two or more correlated image pixels for a present image frame;

determining a composite value for the set of correlated data;

receiving a prior composite value corresponding to the set of two or more correlated image pixels from a prior image frame;

determining a new filtered composite value for the set of two or more correlated image pixels for the present image frame;

determining a pixel correction value based upon the new filtered composite value for the set of two or more correlated image pixels for the present image frame; and applying the pixel correction value to the set of correlated data to reduce correlated noise in the set of two or more image pixels for the present image frame.

* * * * *